United States Patent [19]

Wardman

[11] 4,150,923
[45] Apr. 24, 1979

[54] RECIPROCATING PUMP POWERED BY SOLAR AND WIND ENERGY

[76] Inventor: John C. Wardman, 1060 San Tomas Aquino Rd., Campbell, Calif. 95008

[21] Appl. No.: 898,299

[22] Filed: Apr. 20, 1978

[51] Int. Cl.$^2$ .................. F04B 17/00; F03G 7/02; F03G 7/06
[52] U.S. Cl. .................. 417/379; 60/641; 60/531
[58] Field of Search .......... 417/321, 379; 60/398, 60/531, 641

[56] References Cited

U.S. PATENT DOCUMENTS

| | | | |
|---|---|---|---|
| Re. 27740 | 8/1973 | Schuman | 417/207 |
| 2,688,923 | 9/1954 | Bonaventura et al. | 417/379 |
| 3,112,862 | 12/1963 | Sherock | 417/379 |
| 3,203,167 | 8/1965 | Green, Jr. | 60/641 |
| 3,309,012 | 3/1967 | Booth et al. | 417/379 |
| 3,937,599 | 2/1976 | Thureau et al. | 417/379 X |
| 3,972,651 | 8/1976 | Fletcher et al. | 417/379 X |
| 3,984,985 | 10/1976 | Lapeyre | 60/641 |
| 3,989,417 | 11/1976 | Neidigh | 417/379 |
| 4,041,707 | 8/1977 | Spector | 60/641 |
| 4,068,476 | 1/1978 | Kelsey | 417/379 X |

FOREIGN PATENT DOCUMENTS 137424 12/1902 Fed. Rep. of Germany ............ 60/641

Primary Examiner—Carlton R. Croyle
Assistant Examiner—Leonard E. Smith

[57] ABSTRACT

Two spaced-apart closed pipes containing a vaporizable working fluid are each successively heated by focusing sun rays on the pipe and then chilled by directing wind along the pipe while shielding the pipe from the sun rays. As one pipe is heated, the other is chilled so that a pressure differential is built up therebetween in the working fluid. A piston in a pump has opposed shafts which push and pull the piston, with an end of each arm forming a moving sealed closure for each of the closed pipes which communicates with the working fluid therein.

11 Claims, 2 Drawing Figures

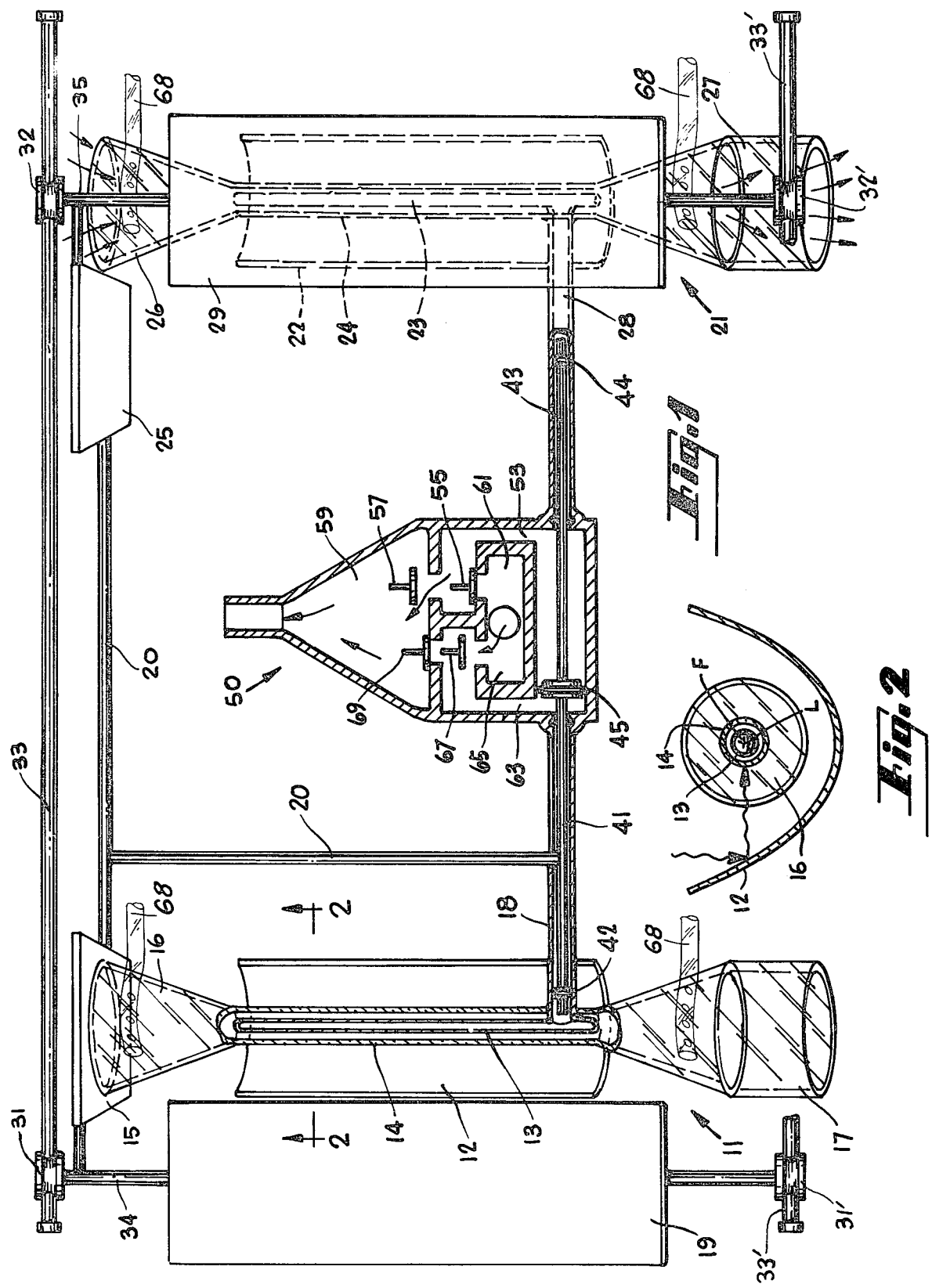

RECIPROCATING PUMP POWERED BY SOLAR AND WIND ENERGY

BACKGROUND OF THE INVENTION

1. Field of the Invention

This invention relates to reciprocating pump apparatus for converting solar and wind energy to mechanical energy.

2. Prior Art

A number of solar powered pump devices are known in the prior art. An example is U.S. Pat. No. 2,688,923 to Bonaventura, et al. for a solar energy pump using two alternatively heated boilers positioned on a common rocker arm, with the gas in one boiler being allowed to cool while the gas in the other boiler is being heated by the concentrated rays of the sun.

Sherock's patent, U.S. Pat. No. 3,112,862, for a reciprocating solar-driven device, uses the expansion force of a heated gas to force a piston upwardly against one or more downwardly directed forces, with the upward movement of the piston creating a partial vacuum within the piston central core that ultimately restores the piston to its lowest position.

U.S. Pat. No. 3,023,167 to Green combines a compressed, primary, moderate temperature gas with a secondary gas that has been highly heated by concentrated solar radiation, to produce an increase in enthalpy in the mixed gas and drive a turbine and a compressor.

A reciprocating thermal pump-compressor is the subject of U.S. Pat. No. 3,309,012 to Booth, et al. A volatile liquid is heated by the sun rays, and the resulting pressure from the evaporated gas causes an associated bellows to undergo a compression stroke and to do useful work. The created gas pressure is also utilized to move the volatile liquid out of the sun rays, thus allowing the liquid to cool and recondense. The resulting decrease in gas pressure causes the bellows to expand and produces a bellows suction stroke; the volatile liquid is moved back into the sun by a spring and another bellows combination, and another cycle begins.

U.S. Pat. No. Re. 27,740 to Schuman teaches the use of a reciprocating piston in a cylinder to pump a fluid, with gas in one end of the cylinder being continuously heated and increased in pressure by a heating source such as an electrical heating coil. The heated gas drives the piston in one direction as this gas is simultaneously drained by a check valve. The gas at the other end of the cylinder is compressed by the moving piston, acts as a pneumatic spring, and causes the piston to rebound by reversal of piston motion.

Thureau, et al., in U.S. Pat. No. 3,937,599, discloses a pump for drawing underground water, using solar energy to vaporize a volatile liquid, which displaces a deformable diaphragm in a two-part chamber. The vaporized liquid alternately fills and is exhausted from one of the motor subchambers, and the resulting diaphragm motion forces the flow of an incompressible liquid contained in the second motor subchamber; this in turn drives a pump that is submerged at a lower elevation in the water to be pumped. The Thureau, et al. invention requires a motor to convert differential fluid pressure to mechanical pressure (exerted on the liquid in the second motor chamber) and a pump that is in turn driven by this mechanical energy.

U.S. Pat. No. 3,972,651 to Kirsten for a solar-powered pump teaches the use of incident solar radiation to heat air being forced by its own pressure through a heat exchanger into a working chamber that communicates with a sump containing water at a given level. After the air pressure in the sump is "adequately increased", the sump water is forced through a discharge port and the process recycles. As the water enters the working chamber, the warm air is forced back into the expansion chamber to begin a new solar heating cycle.

A solar engine is disclosed in the U.S. Pat. No. 3,304,985 to Lapeyre, the invention in one embodiment being a wheel-like structure adapted for rotation about the wheel axis. The perimeter of the wheel contains a spaced sequence of double chamber cells, one closed chamber containing an expandible or volatile fluid, and the other chamber containing a non-expandible fluid and being in fluid communication with a conduit lying along the wheel circumference. Approximately one half of the cells are exposed to solar radiation, thereby heating the expandible fluid and forcing the non-expandible fluid out of the adjacent chamber into the conduit. The remaining cells are shielded from receipt of solar radiation and are cooled so as to receive additional quantities of the non-expandible fluid in the appropriate cell chambers. This causes a mechanical unbalance, and the wheel rotates and may perform useful work. This invention utilizes weight differentials rather than pressure differentials, developed within the irradiated cells.

Neidigh, in U.S. Pat. No. 3,989,417, teaches the use of a rotatable wheel with a sequence of piston assemblies mounted thereon and a narrowly directed solar radiation focusing means, to perform useful work through a high pressure fluid accumulator. Solar radiation is focused on one piston assembly, containing a volatile fluid at one end. The influx of heat causes the volatile fluid to expand and drive the piston in a first direction, thus forcing a second fluid in front of the piston into a high pressure fluid accumulator for subsequently performing useful (hydraulic) work. A motor then rotates the wheel to another position to expose another piston assembly and repeat the process. The expandible fluid in the first piston assembly now cools, and the piston is caused to retract in a second direction, opposite to the first direction, so as to fill the chamber in front of the piston with the second fluid for subsequent repetition of the work cycle. This invention requires the use of a motor or other device to rotate the wheel and of separate means to refill one chamber of each piston assembly with the second fluid.

A somewhat similar operation mechanism is taught by U.S. Pat. No. 4,041,707 to Spector for an underwater solar energy conversion unit, which exploits the difference between the surface temperature of a water body such as the sea, warmed by the sun, and the water temperature at the depth of immersion of the conversion unit. A piston or bellows is alternately driven back and forth by the air pressure difference developed in a variable temperature chamber and a constant temperature chamber. The unit drives an hydraulic pump which is also immersed in the body of water.

An object of the present invention is to devise a pump which uses both sun and wind energy synergistically to do useful work.

SUMMARY OF THE INVENTION

The present invention provides a reciprocating pump apparatus, driven by the sun's radiation and wind energy, that performs useful work during each half cycle of operation. Two similar solar radiation concentration and fluid heating devices communicate with one another through a pipe in which a piston is located. The fluid in one heating device is exposed to the sun and shielded from wind while the other heating device is shielded from the sun and chilled by the wind, and the resulting fluid pressure differential developed drives the piston toward the cooler fluid. Movement of the piston ultimately causes the exposed heating device to become shielded from the sun and chilled by the wind, the shielded device, having the cooler fluid therein, to become exposed to the sun's radiation and the wind blocked. The piston is reversed in direction, and the process repeats itself. At each half stroke, the piston may perform useful work through an associated pump.

BRIEF DESCRIPTION OF THE DRAWINGS

FIG. 1 is a plan view of the invention, utilizing two solar and wind energy concentrators and a piston-driven pump.

FIG. 2 is a cross sectional view of a solar energy focusing means for the apparatus of FIG. 1.

DESCRIPTION OF THE PREFERRED EMBODIMENT

With reference to FIG. 1, two solar and wind energy concentrators, 11 and 21, are shown for operating piston 45 in pump 50. Concentrator 11 has an elongated outer shell 12 which is parabolic, semi-elliptical or semi-circular in cross section. The cross sectional shape should have a focus preferably within the curve. Outer shell 12 resembles a closed end longitudinal section of a half cylinder, open at the top and having a light reflective interior surface. Outer shell 12 is oriented so that substantially all of the sun rays falling on the outer shell's interior surface may be brought into focus along a focal line corresponding to the locus of cross sectional focal points. Outer shells of the type described are known and typically have mirror finishes as interior surfaces. Such shells may be purchased commercially.

A pair of substantially coaxial pipes 13, 14 is disposed with the common axis along the focal line or very near to it. The inner pipe 13 is heat conducting, preferably copper with a diameter of approximately one-half inch and the outer pipe 14 being transparent material, such as glass. The outer pipe 14 is spaced about one-half inch from the inner pipe although these size dimensions are not critical. The inner pipe 13 is preferably painted or anodized black or made with an equivalent solar-radiation absorbing surface finish.

Inner pipe 13 is sealed and contains a working fluid which is liquid when cooled and becomes gaseous when heated, as described herein. Inner pipe 13 has a port opening to interconnecting pipe 18 so that fluid from inner pipe 13 may expand into or be pushed from interconnecting pipe 18.

Outer pipe 14 is used to trap heat entering the pipe when it is exposed to sunlight during one-half cycle of operation and to provide an exit path for trapped heat and allow cool air therethrough during the other half-cycle of operation. Funnel shaped air intake 16 and air exhaust 17 are connected to opposite ends of outer pipe 14 for increasing air velocity through outer pipe 14. In other words, a venturi tube is created about inner pipe 13. Air intake 16 and air exhaust 17 may be reversed, depending on wind direction.

A wind shield 15, mounted for covering air intake 16, or air exhaust 17, interrupts the flow of air through outer pipe 14. Wind shield 15 is a panel which substantially blocks air from entering outer pipe 14 when the panel is fully in front of the air intake or exhaust.

The exact dimensions of the panel are not critical, but the panel should be made of light weight material, yet sturdy enough so that it will not be damaged by wind. The windshield 15 is moved by means of being connected to one of the arms of the T-shaped connector 20 which is described more fully below. The windshield 15 derives mechanical support from a hanger bar 34 which is mounted for movement on rail 33 by means of a wheel 31.

A sun shield 19 is an opaque panel of a size for covering outer shell 12 so that the sun's direct rays do not reach the interior thereof. Preferably, the panel is rigid and is mechanically supported by the hanger bar 34 which provides cantilever support for the sun shield 19. The relationship of wind shield 15 and sun shield 19 is such that when the wind shield 15 fully covers the air intake 16, the sun shield 19 completely uncovers the outer shell 12 of piston driver 11. Conversely, when sun shield 19 completely covers the outer shell 12, the wind shield 15 completely uncovers the air intake 16. The purpose of sun shield 19 and wind shield 15 is to control the half cycles of operation of the piston driver 11. A similar sun shield and wind shield are provided for piston driver 21 so that the half cycles of the piston drivers 11, 21 complement each other. With the outer shell 12 completely uncovered, and the outer pipe 14 closed against air flow, the sun's rays heat the fluid in inner pipe 13 until the fluid is partially or wholly vaporized. The fluid enters interconnecting pipe 18.

First interconnecting pipe 18 penetrates outer pipe 14 passing completely therethrough and opens into inner pipe 13 so that working fluid in the inner pipe 13 can pass into the interconnecting pipe 18. First interconnecting pipe 18 extends past the outer shell 18 a slight distance, usually not more than half the distance from the outer shell to pump 50. The cross sectional dimension of first interconnecting pipe 18 is such that it snugly accommodates a shaft 41 which passes into it for sliding reciprocating motion therein. The shaft 41 is connected to piston 45 in pump 50 on one end, opposite the first interconnecting pipe 18, with a seal preventing fluid loss from pump 50. On the opposite end, within first interconnecting pipe 18 the shaft 41 has O-ring type seals connected to the shaft so that the working fluid can push against shaft 41, but cannot escape outside the first interconnecting pipe 18. Work is transmitted from the inner pipe 13 to the shaft 41.

Concentrator 21 is substantially identical to concentrator 11, but is spaced a distance therefrom. Concentrator 21 includes the outer shell 22 having a reflective inner surface like the outer shell 12. Two coaxial pipes, including the heat conducting inner pipe 23 and the radiation transparent outer pipe 24 are disposed along the focal line of the outer shell 22. A windshield 25 is cantilevered from a hanger bar 35 which is mounted for motion on rail 33 by means of wheel 32.

Air intake 26 is connected to one end of the outer pipe 24, while at the opposite end an air exhaust 27 is connected. The air intake and air exhaust are funnel shaped and are substantially identical to air intake and exhaust 16, 17. A second interconnecting pipe 28 communicates with inner pipe 23 by means of a port therein and through the outer pipe 24. The second interconnecting pipe 28 is preferably co-linear with the first interconnecting pipe 18. The second shaft 43 is connected to piston 45 in pump 50 and extends into the second interconnecting pipe 28 where it terminates with O-ring type seal 44 near the terminal end thereof. The length of interconnecting pipe 28 is such that seal 44 does not exit from the pipe. This is important in order that fluid within the inner pipe 23 does not travel beyond seal 44 toward pump 50.

A sunshield 29, similar to sunshield 19 is disposed above the outer shell 22. Sunshield 29 is of a size for covering outer shell 22 during a half cycle of operation. Sunshield 29 is supported by hanger bar 35. One arm of hanger bar 35 is connected to the windshield 25 which in turn is connected to the T-shaped connector 20 in the same way that windshield 15 transmits the motion of T-shaped connector 20 to the sunshield 19.

Each of the sunshields is thus adapted to alternately partially or fully cover one concentrator and partially or fully expose the other concentrator with wind cooling being available to the partially or fully covered concentrator. For example, when piston 45 of pump 50 has been pulled fully to the left in FIG. 1, sunshield 29 completely shields outer shell 22 from sun rays while at the same time the windshield 25 allows wind energy through the outer pipe 24 so as to cool the volatile fluid contained in the inner pipe 23.

At the climax of the opposite half cycle, the outer shell 12 is fully exposed to the sun by motion of the sunshield 29, while outer shell 22 is completely shielded by sunshield 29. In this instance, the volatile fluid in the inner pipe 13 is rapidly heated by the focusing of sun rays on the inner pipe thereby causing vaporized fluid to work against seal 42 and pushing piston 45 by means of shaft 41.

The sealing of inner pipes 13 and 23, together with the vaporization and cooling of the working fluid allows the buildup of a sufficient pressure differential in a rapid time to cause the piston 45 to reciprocate within the pump 50.

In the above mentioned description, only a single pair of windshields are shown and described. Clearly, another pair of windshields, opposite the first pair, could be added where needed. The rail system described herein for moving the hanger bars 34 and 35 is but a single example of a means for supporting and moving the sun and windshield associated with each piston driver. While the sun and windshield have been described as moving as a differential pressure is exerted upon the seals 42, 44, it may be desirable to keep the sun and windshields in extreme positions, either fully open or fully closed, and allow the seals 42, 44 to work against a spring until maximum travel in one direction is reached. At that point, the springs are released allowing the positions of the sun and windshield to reverse while the opposite differential pressure works against another set of springs for reversing the operation.

The pump 50 is a conventional reciprocating pump with compartments, 59, 61, 63 and 65 defined by valves 55, 57, 67 and 69, as well as the piston 45. The pump is especially adapted for pumping water which enters compartments 61 and 65 through an inlet 51. As the piston is rapidly pushed or pulled the volume of 53 and 63 is changed forcing movement of the valves and motion of the water through an outlet throat 71. Water or any other substance being pumped may be drawn into the pumping compartments by a suction force created at inlet 51 created by motion of piston 45. This description of pump 50 is merely illustrative of one type of reciprocating pump. Other types may be used.

The working fluid within each of the inner pipes 13, 23 is one having a relatively sharply defined vaporization temperature and a small heat of vaporization. For example, carbon dioxide.

An alternative to carbon dioxide is carbon tetrachloride or ammonia which have favorable heat of vaporization characteristics. Of course, the working fluid which is employed may be selected for maximum efficiency depending upon climate and seasonal environmental conditions which may be encountered where the present apparatus is used. In order to enhance chilling of each of the inner pipes on the cooling half cycle, air which enters a nozzle connected to one of the outer pipes 14, 24 may be sprayed with water droplets from a water spray means 68. In this instance, the outer pipes 14, 24 should be provided with drain holes for removing any water which condenses on the surfaces of the inner or outer pipes.

With reference to FIG. 2, a side sectional view taken along the lines 2—2 of FIG. 1 shows that sun rays, represented by wavy arrows, are directed toward a focal point F in the center of inner tube 13. The working fluid L within the inner tube vaporizes in response to heating by the sun rays. Outer pipe 14 is shown to concentrically surround the air pipe 13. The exterior surface of air intake 16 appears to surround outer pipe 14.

Returning to FIG. 1, it will be seen that the air intakes 16, 26 are generally conical in shape, while the air exhausts 17, 27 are also conical but have an extended cylindrical portion. Either of the conical end members may be used as an air intake depending on the prevailing winds. The funnel shape which is selected for air intakes and air exhausts should be a shape which maximizes venturi effect cooling through the outer pipe. The rails 33, 33' which support wheels 31, 31' and 32, 32' are but one means for moving the sun shades and windshields of the present invention; those skilled in the art will recognize other means for moving these devices.

The present invention is contemplated for use in many applications. For example, in rural areas where the cost of electricity is particularly high due to long transmission distances, pumps of the type described would be useful for drawing water from wells for farming, providing adequate sun and wind are available. Other pump applications are well known.

What is claimed is:

1. A solar and wind energy concentrator apparatus comprising, a solar energy fluid heating means comprising two substantially coaxial hollow pipes including a heat conductive inner pipe being sealed and confining a vaporizable working fluid therein and a light transparent outer pipe, said coaxial pipes axially disposed along a focal line with an annular region between said pipes, solar energy focusing means proximate to said coaxial pipes for accepting and focusing sun rays onto a focal line where said coaxial pipes are disposed, and air intake means in communication with said annular region for directing wind into the annular region, an interconnecting pipe, in communication with the interior of inner heat conducting pipe for directing fluid from the inner pipe to a differential pressure utilization means, pump means connected to said interconnecting pipe for converting pressure changes in said fluid into useful work, a sun shield means for alternately shielding and uncovering said solar energy fluid heating means with respect to direct solar radiation, and a wind shield means for alternately interrupting and permitting wind flow into the annular region between pipes whereby said sun shield means and wind shield means are operable to create pressure changes in said working fluid.

2. Apparatus according to claim 1, wherein said solar energy focusing means of each solar energy fluid heating means includes a cylindrical mirror of concave cross section, open at the top, surrounding said associated coaxial pipes.

3. Apparatus according to claim 1, wherein said air intake means of each solar energy fluid heating means includes a venturi nozzle connected to said outer pipe.

4. Apparatus according to claim 3, wherein said nozzle includes means for spraying water into a passageway defined by said nozzle.

5. Reciprocating pump apparatus for conversion of solar and wind energy to mechanical energy, the apparatus comprising, first solar energy fluid heating means, comprising two substantially coaxial hollow pipes including a heat conductive inner pipe being sealed and confining a vaporizable working fluid therein and a light transparent outer pipe, said coaxial pipes axially disposed along a focal line with an open ended annular region between said pipes, solar energy focusing means proximate to said coaxial pipes for accepting and focusing sun rays onto a focal line where said coaxial pipes are disposed, and air intake means in communication with said annular region for directing wind into the annular region;

second solar energy fluid heating means, substantially similar to and spaced apart from the first solar energy fluid heating means;

a first interconnecting pipe, in communication with the interior of the inner heat conducting pipe of the first solar heating means, for directing the fluid within the inner pipe toward the second solar heating means;

a second interconnecting pipe, in communication with the interior of the inner heat conducting pipe of the second solar heating means, for directing the fluid within the inner pipe toward the first solar heating means;

a first movable, pressure-responsive shaft, positioned within and movable longitudinally along the first interconnecting pipe in response to fluid pressure from the vaporizable fluid contained in the inner heat conducting pipe of the first solar heating means;

a second movable, pressure-responsive shaft, positioned within and movable longitudinally along the second interconnecting pipe in response to fluid pressure from the vaporizable fluid contained in the inner heat conducting pipe of the second solar heating means;

a piston, positioned between the first and the second movable shafts, so that the piston moves away from the solar heating means that develops a larger fluid pressure and the piston moves toward the solar heating means that develops a smaller fluid pressure;

pump means, connected to the piston, for transferring a liquid from one location to another in response to movement of the piston;

a first sun shield, connected to the first movable shaft, for shielding the solar focusing means of the first solar heating means from direct solar radiation as the first shaft moves towards the first solar heating means;

a second sun shield, connected to the second movable shaft, for shielding the solar focusing means of the second solar heating means from direct solar radiation as the second shaft moves towards the second solar heating means;

first wind shield, connected to the first sun shield, for interrupting at least at one end thereof the flow of wind into and out of the annular region defined between the two coaxial pipes of the first solar heating means when said pipes are exposed directly to solar radiation; and a second wind shield, connected to the second sun shield for interrupting at least at one end thereof the flow of air into and out of the annular region defined between the two coaxial pipes of the second solar heating means when said pipes are exposed directly to solar radiation.

6. Apparatus according to claim 5, wherein said volatile fluid contained in said inner heat conducting pipes in carbon dioxide.

7. Apparatus according to claim 5, wherein each of said movable, pressure-responsive shafts has an O-ring, mounted between said shaft and said associated interconnecting pipe, to prevent leakage of said fluid from said interconnecting pipe.

8. Apparatus according to claim 5, wherein said air intake means of each solar energy fluid heating means includes a venturi nozzle connected to said outer pipe.

9. Apparatus according to claim 8, wherein said nozzle includes means for spraying water into a passageway defined by said nozzle.

10. Apparatus according to claim 5, wherein said solar energy focusing means of each solar energy fluid heating means includes a cylindrical mirror of concave cross section, open at the top, surrounding said associated coaxial pipes.

11. Apparatus according to claim 10, wherein said mirror cross section is substantially parabolic.

* * * * *

UNITED STATES PATENT AND TRADEMARK OFFICE
CERTIFICATE OF CORRECTION

PATENT NO. : 4,150,923

DATED : April 24, 1979

INVENTOR(S) : John C. Wardman

It is certified that error appears in the above-identified patent and that said Letters Patent are hereby corrected as shown below:

Claim 6, Column 8, line 37, the term "in carbon dioxide." should read --is carbon dioxide.--

Signed and Sealed this

Fourteenth Day of August 1979

[SEAL]

Attest:

Attesting Officer

LUTRELLE F. PARKER
Acting Commissioner of Patents and Trademarks